United States Patent [19]

Teles De Menezes, Junior

[11] Patent Number: 4,872,804
[45] Date of Patent: Oct. 10, 1989

[54] WIND TURBINE HAVING COMBINATION WIND DEFLECTING AND FRAME ORIENTING MEANS AS WELL AS DUAL RUDDERS

[76] Inventor: Antonio Teles De Menezes, Junior, Fremunde, Quita da Vista Alegre, Portugal

[21] Appl. No.: 89,561

[22] Filed: Aug. 26, 1987

Related U.S. Application Data

[63] Continuation-in-part of Ser. No. 905,329, Sep. 9, 1986, abandoned.

[30] Foreign Application Priority Data

Sep. 17, 1983 [PT] Portugal .................................. 81146

[51] Int. Cl.$^4$ .............................................. F03D 1/04
[52] U.S. Cl. ................................... 415/2.1; 415/905; 416/9
[58] Field of Search .................. 416/197 A, 119, 9–11, 416/DIG. 6; 415/2 R–4 R

[56] References Cited

U.S. PATENT DOCUMENTS

| | | | |
|---|---|---|---|
| 303,585 | 8/1884 | Morehouse | 416/197 A |
| 419,345 | 1/1890 | Otto | 415/2 R |
| 705,922 | 7/1902 | Gran | 415/2 R |
| 744,065 | 11/1903 | Gran | 415/18 |
| 974,995 | 11/1910 | Schies | 416/176 A X |
| 979,098 | 12/1910 | Scheubeck | 416/197 A |
| 1,404,715 | 1/1922 | Hegwer | 415/18 |
| 1,531,964 | 3/1925 | McHenry | 415/4 R |
| 1,586,914 | 6/1926 | Palm | 415/3 R |
| 1,808,874 | 6/1931 | Wilson | 416/197 A |
| 1,812,741 | 6/1931 | Espinosa | 416/197 A |
| 1,903,307 | 4/1933 | Gillio | 415/3 R |
| 1,935,097 | 11/1933 | Nelson | 415/4 R |
| 2,224,851 | 12/1940 | Lea | 416/197 A |
| 2,784,556 | 3/1957 | Perdue | 416/9 |
| 3,883,261 | 5/1975 | Saxmann | 415/3 R |
| 3,895,882 | 7/1975 | Moyer | 416/9 X |
| 4,234,289 | 11/1980 | Lebost | 416/197 A X |
| 4,278,896 | 7/1981 | McFarland | 416/DIG. 6 |
| 4,279,569 | 7/1981 | Harloff | 415/4 R X |
| 4,295,783 | 10/1981 | Lebost | 415/2 R |
| 4,321,005 | 3/1982 | Black | 416/197 A X |
| 4,365,929 | 12/1982 | Retz | 416/197 A X |
| 4,571,152 | 2/1986 | Tatar | 416/197 A X |
| 4,652,206 | 3/1987 | Yeoman | 416/41 X |

FOREIGN PATENT DOCUMENTS

| | | | |
|---|---|---|---|
| 731946 | 2/1943 | Fed. Rep. of Germany | 416/10 |
| 2410802 | 9/1975 | Fed. Rep. of Germany | 415/4 R |
| 2600627 | 7/1977 | Fed. Rep. of Germany | 415/2 R |
| 6791 | 3/1907 | France | 416/197 A |
| 501843 | 4/1920 | France | 415/2 R |
| 575173 | 7/1924 | France | 416/9 |
| 727649 | 6/1932 | France | 416/197 A |
| 1074470 | 10/1954 | France | 416/197 A |
| 2286954 | 4/1976 | France | 416/197 A |
| 43047 | 4/1977 | Japan | 415/3 R |
| 32075 | 2/1982 | Japan | 415/3 R |
| 7806184 | 12/1979 | Netherlands | 416/9 |
| 52383 | 1/1919 | Sweden | 415/4 R |
| 146031 | 7/1920 | United Kingdom | 416/197 A |

Primary Examiner—Everette A. Powell, Jr.
Attorney, Agent, or Firm—Wenderoth, Lind & Ponack

[57] ABSTRACT

A device for generating power from wind which includes a shaft extending in a longitudinal direction and propelling elements mounted on the shaft. The shaft is mounted for rotation in a frame which is also mounted for rotation. The device also includes a deflector on the frame for deflecting wind into the propelling elements by orienting the frame due to rotation thereof to have a portion thereof facing the direction of travel of the wind. The deflector also increases the force of the wind on the propelling elements by compressing the wind and further deflects the wind to strike the propelling elements at a position radially outwardly of the shaft and radially inwardly of an outer periphery of the frame. The deflector further prevents the wind from striking the propelling elements along a part of the outer periphery of the frame which faces the wind direction.

19 Claims, 1 Drawing Sheet

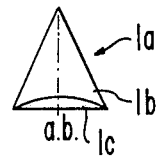
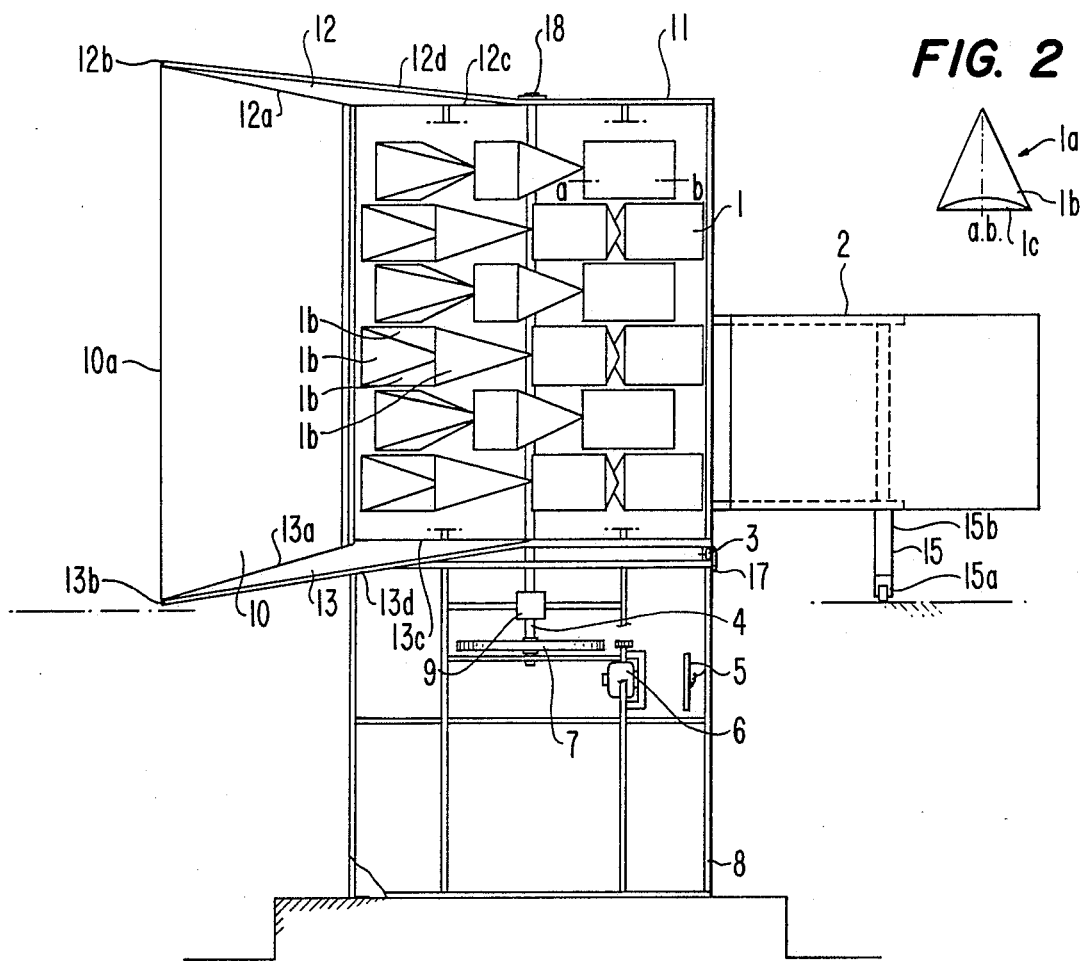
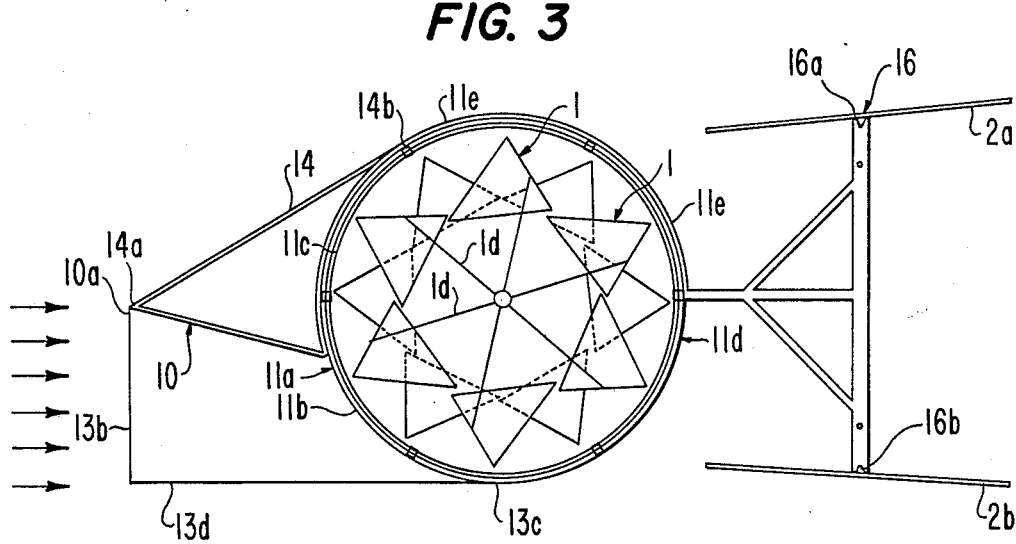

WIND TURBINE HAVING COMBINATION WIND DEFLECTING AND FRAME ORIENTING MEANS AS WELL AS DUAL RUDDERS

This is a Continuation-in-part application of Ser. No. 905,329 filed on Sep. 9, 1986, now abandoned.

BACKGROUND OF THE INVENTION

1. Field of the Invention

The present invention relates to a wind generator which includes a wind deflector for concentrating the force of the wind against propelling surfaces disposed around an output shaft which can be connected to electricity producing devices or a water pump.

2. Description of the Prior Art

Many different constructions of wind generators are known, such as, those disclosed by Otto (U.S. Pat. No. 419,345), Gran (U.S. Pat. No. 705,922 and 744,065), Hegwer (U.S. Pat. No. 1,404,715), McHenry (U.S. Pat. No. 1,531,964), Palm (U.S. Pat. No. 1,586,914), Gillio (U.S. Pat. No. 1,903,307), Nelson (U.S. Pat. No. 1,935,097) and Saxmann (U.S. Pat. No. 3,883,261).

In addition to the above mentioned patents, wind generators are disclosed by Schmidt (Swedish Patent No. 52,383), Christofleau (French Patent Publication No. 501,843), Malzahn (German Patent Publication No. DT2410802A1), Nishi (Japanese Laid-Open Patent Application No. 52-43047), Leide (German Patent Publication No. DT2600627A) and Nakada (Japanese Laid-Open Patent Application No. 57-32075).

All of the wind generators disclosed in the above references differ from the wind generator of the present invention.

SUMMARY OF THE INVENTION

An object of the present invention is to provide a device for generating power from the wind wherein maximum use of the kinetic energy of the wind is obtained at an extremely low cost. The device comprises a shaft, propelling elements mounted on the shaft, a frame mounted for rotation on a fixed support surface, the frame supporting the shaft for rotation about a central axis thereof due to a force of the wind acting on the propelling elements, and means associated with the frame for deflecting wind into the propelling elements by orienting the frame to have a portion thereof facing the direction of travel of the wind and for increasing a force of the wind on the propelling elements by compression of the wind, the means deflecting the wind to strike the propelling elements at a position radially outwardly of the central axis of the shaft and radially inwardly of a first part of the portion of the frame, the means preventing the wind from striking the propelling elements along a second part of the portion of the frame facing the wind direction.

Another object of the invention is to provide rudder means on a side of the frame opposite to the portion facing the wind, the rudder means being deflected by the wind for orienting the portion of the frame in an angular position facing the direction of the wind. The rudder means comprises a pair of spaced-apart rudders, each of which is pivotable about a rudder axis parallel to the central axis and each being fixable in a desired angular position with respect to the rudder axis. The rudder means includes a rudder support extending from the frame, the rudder support further including roller means extending in a direction parallel to the central axis for rollingly engaging a fixed support surface. The roller means comprises a pair of rollers, each of which is rotatably mounted on a free end of a shaft extending from the rudder support at a position adjacent one of the rudders, the rudder axes being spaced apart a distance substantially equal to a diameter of a path defined by radially outermost surfaces of the propelling elements.

The means for deflecting the wind into the propelling elements and for increasing the force of the wind on the propelling elements comprises a pair of sidewalls extending parallel to the central axis, the sidewalls being joined together along first edges thereof at a position spaced radially outwardly from the portion of the frame, the pair of sidewalls having second edges which are spaced apart and joined to the second part of the portion of the frame facing the wind, one of the sidewalls deflecting the wind into the propelling elements. A pair of walls extend laterally from the one sidewall deflecting wind into the propelling elements, the pair of walls being spaced apart and converging towards each other in a direction towards the central axis to cause compression of the wind and increase the force of the wind on the propelling elements. The walls include first edges joined to the one sidewall deflecting wind into the propelling elements, second edges facing the direction of the wind, third edges joined to opposite ends of the first part of the portion of the frame facing the wind and fourth edges extending between the second and third edges, the fourth edges being free edges so that the means is open between the fourth edges of the walls.

The propelling elements of the present invention each comprise a member which is recessed at one end and closed at an opposite end, the member having a convex surface forming the recessed end. The member includes a base wall forming the convex surface and a plurality of sidewalls, the sidewalls and base wall being joined to define the recessed end and the closed end of the member. The plurality of sidewalls comprises four sidewalls, each of which is planar and triangular in shape with an apex and a base thereof, the apex of each of the sidewalls being joined together to form the closed end of the member and opposite ends of the base of each of the sidewalls being joined together and to the base wall to form the recessed end of the member.

The propelling elements of the invention are arranged in at least one plane which is perpendicular to the central axis, the propelling elements being spaced radially outwardly from the central axis and being spaced circumferentially apart. The propelling elements are preferably arranged in a plurality of planes, each of which is perpendicular to the central axis, a plurality of the propelling elements being spaced radially outwardly from the central axis and being spaced circumferentially apart in each of the planes. The plurality of propelling elements in each of the planes can be offset angularly with respect to the plurality of propelling elements in each adjacent plane. The propelling elements can be arranged in six planes with six propelling elements in each of the planes.

The frame of the invention includes rollers at an end thereof extending perpendicularly to the central axis and a base frame can be provided beneath the frame, the base frame including track means for guiding the rollers on the frame in a circular path. The base frame can contain the necessary elements for converting rotation of the shaft into electricity, such as, one or more alternators connected to the shaft by suitable gear means. The frame is preferably open on one side and a sidewall is provided on the opposite wall, the open side of the frame providing an entrance and exit for air passing through the frame.

BRIEF DESCRIPTION OF THE DRAWINGS

The invention will be described with reference to the attached drawings, in which:

FIG. 1 shows a cut away side view of the device according to the present invention;

FIG. 2 shows a schematic diagram of a propelling element according to the present invention; and FIG. 3 shows a top cut away view of the device shown in FIG. 1.

DETAILED DESCRIPTION OF THE PREFERRED EMBODIMENTS

The device for generating power from the wind according to the present invention includes a plurality of propelling elements 1 which are mounted on a shaft 4 which can extend in a vertical or horizontal direction, although the shaft 4 is shown extending vertically in FIG. 1. A frame 11 includes a hub 18 at a top end thereof for supporting the shaft 4 for rotation about a central axis of the shaft due to a force of the wind acting on the propelling elements. The frame 11 is also mounted for rotation about an axis parallel to the central axis of the shaft. The device also includes wind deflecting means 10, 12-14 associated with the frame 11 for deflecting wind into the propelling elements, the wind deflecting means 10,14 in combination with rudder means being effective for orienting the frame due to rotation thereof to have a portion 11a thereof facing the direction of travel of the wind, the wind deflecting means 12, 13 also being effective for increasing a force of the wind on the propelling elements 1 by compression of the wind. The means 10, 12-14 deflects the wind to strike the propelling elements 1 at a position radially outwardly of the central axis of the shaft 4 and radially inwardly of a first part 11b of the portion of the frame, the means 10, 12-14 preventing the wind from striking the propelling elements 1 along a second part 11c of the portion 11a of the frame 11 facing the wind direction.

The frame orienting and wind compressing means 10, 12-14 includes rudder means 2 disposed on a side 11d of the frame 11 opposite to the portion 11a thereof facing the wind. The rudder means further deflects the wind for orienting the portion 11a of the frame 11 in an angular position facing the direction of the wind. In the embodiment shown in FIG. 3 the rudder means comprises a pair of spaced-apart rudders 2a, 2b, each of which has an inner planar surface facing the other rudder and an outer planar surface on the side thereof opposite to the inner planar surface is pivotable about a rudder axis 16a, 16b extending parallel to the central axis of the shaft 4. The rudder axes are spaced-apart by a distance substantially equal to an outermost dimension of the frame 11 measured in a direction perpendicular to the central axis of the shaft 4, as shown in FIG. 3. The rudders 2a, 2b are fixable in a desired angular position with respect to its rudder axis 16a, 16b whereby any small rotation of the frame 11 causes one or the other of the rudders 2a, 2b to be influenced immediately by the action of the wind. As a result, the frame 11 is maintained in a desired angular position with the portion 11a facing the direction of the wind for maximum use of the air flow against the propelling elements 1. The combination of the wind deflecting means 10, 12 with the rudder means 2 comprising the two spaced-apart rudders 2a, 2b ensures that the device for generating power from the wind according to the present invention is always turned windward so that the speed of rotation of the propelling elements 1 is increased and quickly stabilized, even when the wind direction changes significantly.

The rudder means 2 includes a rudder support 2c extending from the frame 11, the rudder support 2c further including roller means 15 extending in a direction parallel to the central axis of the shaft 4 for rollingly engaging a fixed support surface, as shown in FIG. 1. The roller means 15 comprises a pair of rollers 15a, only one of which is shown in FIG. 1, the rollers 15a being rotatably mounted on a free end of a shaft 15b extending from the rudder support 2c at a position adjacent one of the rudders 2a, 2b. The rudder axes 16a, 16b are spaced apart by a distance substantially equal to a diameter of a path defined by radially outermost surfaces of the propelling elements whereby the rudders can be oriented such that the planes containing the outer planar surfaces of the rudders extend radially inwardly of the frame 11 so that wind forces acting on the rudders only act on the outer planar surfaces of the rudders, as shown in FIG. 3. The provision of the roller means 15 adds to the stability of the device, especially when the device is of large dimensions. Also, the positioning of the two rudders away from the longitudinal axis of the rudder support 2c allows them to be set up on a lower part of the frame 11 with uppermost ends of the rudders being located below an upper end of the frame, as shown in FIG. 1, which also adds to the overall rigidity and stability of the device.

The frame orienting and wind compressing means 10, 12-14 comprises a pair of sidewalls 10, 14 extending parallel to the central axis of the shaft 4 and which are joined together to form a vertically extending edge facing the wind along first edges thereof 10a, 14a at a position spaced radially outwardly from the portion 11a of the frame 11. The pair of sidewalls 10, 14 have second edges 10b, 14b which are spaced apart and joined to the second part 11c of the portion 11a of the frame facing the wind. One of the sidewalls, sidewall 10, deflects the wind into the propelling elements 1. The frame orienting and wind compressing means further comprises a pair of walls 12, 13 extending laterally from the one sidewall 10, the pair of walls 12, 13 being spaced apart and converging towards each other in a direction towards the central axis to cause compression of the wind and increase the force of the wind on the propelling elements 1. The walls 12, 13 include first edges 12a, 13a joined to the one sidewall 10, second edges 12b, 13b facing the direction of the wind, third edges 12c, 13c joined to opposite ends of the first part 11c of the portion 11a of the frame 11 facing the wind and fourth edges 12d, 13d extending between the second and third edges, the fourth edges being free edges so that the frame orienting and wind compressing means is open between the fourth edges of the walls 12, 13. It can be seen from FIG. 3 that the frame includes a sidewall 11e extending parallel to the central axis of the shaft 4, the sidewall 11e extending circumferentially around one half of the frame 11 with the remaining one half of the frame being open for passage of air therethrough. Thus, the device of the invention is open along one side thereof between the free edges 12d, 13d of the converging walls 12, 13 and between the edge 10b of the side wall 10 and an edge of the side wall 11e at which the rudder support 2c is attached to the frame 11. Applicant has unexpectedly found that the inclusion of a wall extending between the edges 12d, 13d produces a negative effect on the operation of the device according to the invention. As can be seen in FIG. 3, the angle of the sidewall 10 which deflects the wind into the propelling elements 1 can be determined experimentally to provide optimum operating conditions of the device.

The propelling elements 1 comprise a member 1a which is recessed at one end and closed at an opposite end, the member having a convex surface forming the recessed end. The member includes a base wall 1c forming the convex surface and a plurality of sidewalls 1b, the sidewalls 1b and base wall 1c being joined to define the recessed end and the closed end of the member 1a. The plurality of sidewalls 1b preferably comprises four in number, each of the sidewalls 1b being planar and triangular in shape, as shown in FIG. 2, with an apex and a base thereof. The apex of each of the sidewalls is joined together to form the closed end of the member and opposite ends of the base of each of the sidewalls are joined together and to the base wall to form the recessed end of the member 1a. The propelling elements 1 can be arranged in at least one plane which is perpendicular to the central axis of the shaft 4, the propelling elements being spaced radially outwardly from the central axis and being spaced circumferentially apart. The propelling elements are preferably arranged in six planes as shown in FIG. 1, the propelling elements being supported by means 1d extending between the shaft 4 and the propelling elements 1. As shown in FIG. 3, six propelling elements 1 are provided in each plane and the plurality of propelling elements in each of the planes is offset angularly with respect to the plurality of propelling elements in each adjacent one of the planes. In the embodiment shown in FIGS. 1 and 3, thirty-six propelling elements 1 are arranged in six planes with six propelling elements provided in each plane. Due to the configuration of the propelling elements 1 and large number thereof, a large area is exposed to the wind and the aerodynamic shape of the propelling elements 1 enables them to rotate the shaft 4 even at very low wind speeds. Furthermore, with the device according to the present invention, there are no limitations with regard to exposure to strong and intense winds. As such, the device according to the present invention does not require any safety device such as a brake assembly for the shaft 4 and can operate safely under any wind condition, including extremely violent and strong winds due to the combination of the frame orienting sidewalls 10, 14 and the horizontally spaced-apart rudders 2a, 2b whereby wind forces acting on the device produce compressive forces on the sidewalls 10, 14 and on the outer surfaces of the rudders 2a, 2b. The propelling elements 1 are arranged radially outwardly of the shaft 4 so that the area surrounding the shaft is open and any escaping winds do not stop the rotation of the shaft 4. On the other hand, the movement of the propelling elements in a direction opposite to the wind direction is not stopped because of their pyramidal shape which offers the least amount of resistance to their movement against the wind. The aerodynamic shape of the propelling elements allows them to be spaced slightly apart with respect to the propelling elements arranged in adjacent planes, which allows the wind to escape easily during their movement in a direction opposite to the wind direction without producing braking forces. Wind is prevented from striking the propelling elements 1 when they rotate in a direction opposite to the wind direction by the sidewall 14 which extends to the sidewall 11e of the frame.

The frame 11 includes rollers 3 at an end thereof extending perpendicularly to the central axis of the shaft 4. A base frame 8 is fixed to a support surface and the base frame 8 has an end thereof facing the end of the frame 11, the base frame 8 including track means 17 for guiding the rollers on the frame 11 in a circular path. The track means 17 includes wheels engageable between the frame 11 and an outer periphery of the base frame 8 for providing additional safety during rotation of the frame 11 on the base frame 8. The base frame 8 includes self-leveling bearing means 9 for supporting one end of the shaft 4. The base frame 8 also includes means 6 connected to the shaft 4 for generating electricity due to rotation of the shaft 4. The electricity generating means 6 can comprise one or more alternators and the shaft 4 is connected to the alternators by suitable gear means whereby the rate of rotation of the alternator shafts can be increased with respect to the rate of rotation of the shaft 4. The base frame 8 also includes suitable instrumentation 5 for operation of the various components of the device according to the present invention. The self-leveling bearing means 9 includes a regulating centering system which acts in the same manner as the self-leveling bearing of a surveying level to allow for the frame 11 to be oriented in any angular direction without deviation in the centering of the shaft 4 with respect to the frame 11.

The amount of power generated by the device according to the invention will be related to the size of the device. Therefore, the size and number of the electrical generators, such as the one or more alternators, can be adjusted accordingly. The electricity generating means can also be replaced with a water pump which is connected to the shaft 4 by a suitable mechanical arrangement. The various elements of the device according to the invention are preferably made of very light and rigid material having a long life. As mentioned earlier, the quantity and dimensions of the propelling elements are variable depending upon the desired size of the device.

While the present invention has been described with reference to the foregoing embodiments, it will be understood by those skilled in the art that various changes and modifications may be made thereto which fall within the scope of the appended claims.

I claim:

1. A device for generating power from wind comprising:

a shaft having a central axis extending vertically in an axial direction;

propelling elements mounted on said shaft; a frame mounted for rotation about said shaft, said frame supporting said shaft for rotation about said central axis due to a force of the wind acting on said propelling elements;

wind deflecting means associated with said frame in combination with rudder means for orienting said frame to have a portion thereof facing the direction of travel of the wind and the wind deflecting means deflecting wind into said propelling elements, said portion of said frame comprising an open first part and a closed second part of said frame, said wind deflecting means deflecting the wind to strike said propelling elements at a position radially outwardly of said central axis of said shaft and radially inwardly of said first part of said frame and said wind deflecting means preventing the wind from striking said propelling elements at a position radially inwardly of said second part of said frame, said wind deflecting means having a pair of sidewalls forming a vertically extending edge which faces into the wind and which lies in a plane which contains said central axis of said shaft and which is parallel to the wind direction;

said rudder means being disposed on a side of said frame opposite to said portion thereof facing the wind, said rudder means being reflected by the wind for providing forces which counteract wind faces acting on said pair of sidewalls for orienting of said portion of said frame in an angular position facing the direction of the wind, said rudder means comprising a pair of spaced-apart rudders separated from each other in a direction perpendicular to said central axis, each of said rudders being pivotable about a rudder axis parallel to said central axis and being fixable in any one of a plurality of desired angular positions with respect to said rudder axis.

2. The device of claim 1, wherein said rudder means includes a rudder support extending from said frame, said rudder support further including roller means extending in a direction parallel to said central axis for rollingly engaging a fixed support surface.

3. The device of claim 2, wherein said roller means comprises a pair of rollers, each of which is rotatably mounted on a free end of a shaft extending from said rudder support at a position adjacent one of said rudders, said rudders axes being spaced apart distance substantially equal to a diameter of a path defined by radially outermost surfaces of said propelling elements, each of said rudders having an inner planar surface facing the other rudder and an outer planar surface on the side thereof opposite to the inner planar surface, the rudders being oriented such that planes containing the outer planar surfaces of the rudders extend radially inwardly of the frame so that wind forces acting on the rudders only act on the outer planar surfaces of the rudders, the rudders further having uppermost ends thereof located vertically below an upper end of the frame.

4. The device of claim 1, wherein said pair of sidewalls extend in a direction parallel to said central axis and are joined together along first edges thereof at a position spaced radially outwardly from said portion of said frame to form said vertically extending edge, said pair of sidewalls having second edges which are spaced apart and joined to said second part of said portion of said frame facing the wind, a first one of said sidewalls deflecting the wind into said propelling elements.

5. The device of claim 1, wherein each of said propelling elements comprises a member which is recessed at one end and closed at an opposite end, said member having a convex surface forming said recessed end.

6. The device of claim 5 wherein said member includes a base wall forming said convex surface and a plurality of sidewalls, said sidewalls and base wall being joined together to define said recessed end and said closed end of said member.

7. The device of claim 6 wherein said plurality of sidewalls comprises four sidewalls, each of said sidewalls being planar and triangular in shape with an apex and a base thereof, said apex of each of said sidewalls being joined together to form said closed end of said member and opposite ends of said base of each of said sidewalls being joined together and to said base member to form said recessed end of said member.

8. The device of claim 1, wherein said propelling elements are arranged in at least one plane which is perpendicular to said central axis, said propelling elements being spaced radially outwardly from said central axis and being spaced circumferentially apart.

9. The device of claim 8, wherein said propelling elements are arranged in a plurality of planes, each of said planes being perpendicular to said central axis, a plurality of said propelling elements being spaced radially outwardly from said central axis and being spaced circumferentially apart in each of said planes.

10. The device of claim 9, wherein said plurality of propelling elements in each of said planes is offset angularly with respect to said plurality of propelling elements in each adjacent one of said planes.

11. The device of claim 10, wherein said plurality of planes comprises six in number and said plurality of propelling elements in each of said planes comprises six in number, there being thirty-six propelling elements in total number.

12. The device of claim 1, wherein said frame includes rollers at an end thereof extending perpendicularly to said central axis, said device further including a base frame fixed to a support surface, said base frame having an end thereof facing said end of said frame, said base frame including track means for guiding said rollers on said frame in a circular path.

13. The device of claim 1, further comprising means connected to said shaft for generating electricity due to rotation of said shaft.

14. The device of claim 13, wherein said electricity generating means comprises at least one alternator, said shaft being connected to said alternator by gear means for increasing a rate of rotation of an alternator shaft with respect to a rate of rotation of said shaft.

15. The device of claim 1, wherein said frame includes a sidewall extending parallel to said central axis, said sidewall extending circumferentially around one half of said frame with the remaining one half of said frame being open for passage of air therethrough.

16. The device of claim 1, wherein said frame includes bearing means disposed around said shaft for centering said shaft with respect to said frame.

17. The device of claim 1, wherein said rudder axes are spaced apart by a distance substantially equal to an outer most dimension of said frame measured in a direction perpendicular to said central axis of said shaft.

18. The device of claim 3, wherein said uppermost ends of said rudders are located about halfway below said upper end of said frame and said rudders have lowermost ends located adjacent a lower end of said frame.

19. The device of claim 18, wherein said rudders are fixed in angular positions such that forward edges of said rudders facing said frame are located closer together than rear edges of said rudders.

* * * * *